United States Patent [19]
Lavin

[11] Patent Number: 5,591,241
[45] Date of Patent: Jan. 7, 1997

[54] LIQUID VAPOR CONTACT APPARATUS

[75] Inventor: John T. Lavin, Guildford, England

[73] Assignee: The BOC Group plc, Windlesham, England

[21] Appl. No.: 594,365

[22] Filed: Jan. 30, 1996

Related U.S. Application Data

[63] Continuation of Ser. No. 274,054, Jul. 12, 1994, abandoned.

[30] Foreign Application Priority Data

Jul. 19, 1993 [GB] United Kingdom .................. 9315066

[51] Int. Cl.$^6$ ...................................................... B01F 3/04
[52] U.S. Cl. .................. 55/257.6; 261/114.1; 261/114.3
[58] Field of Search ...................... 55/257.6; 261/114.1, 261/114.3

[56] References Cited

U.S. PATENT DOCUMENTS

| | | | |
|---|---|---|---|
| 2,832,578 | 4/1958 | Gilmore | 261/114.1 |
| 2,877,099 | 3/1959 | Bowles | 261/114.1 |
| 3,231,251 | 1/1966 | Scheibel | 261/114.1 |
| 3,647,192 | 3/1972 | De Groot et al. | 261/114.1 |
| 4,105,723 | 8/1978 | Mix | 261/114.1 |
| 4,184,857 | 1/1980 | Iijima et al. | 261/114.3 |
| 5,091,119 | 2/1992 | Biddulph et al. | 261/114.3 |

FOREIGN PATENT DOCUMENTS

| | | | |
|---|---|---|---|
| 0361776 | 4/1990 | European Pat. Off. . | |
| 2725311 | 12/1977 | Germany . | |
| 1049074 | 10/1983 | U.S.S.R. | 261/114.1 |
| 1142132 | 2/1985 | U.S.S.R. | 261/114.1 |

OTHER PUBLICATIONS

British Chemical Engineering, vol. 5, Oct. 1960 pp. 723–730—B. Melichar Sieve Trays for Distillation Columns—p. 723; Figures 3–5.

Primary Examiner—Tim R. Miles
Attorney, Agent, or Firm—David M. Rosenblum; Larry R. Cassett

[57] ABSTRACT

An apparatus comprising a liquid-vapor contact column housing an array of vertically spaced liquid-vapor contact trays and an arrangement of downcomers that conduct liquid from tray-to-tray down the array. In a vapor space between the trays there are liquid-vapor disengagement devices having vapor passages therethrough and defining surfaces for the flow thereacross of any liquid disengaged from vapor ascending the column. Each of the devices is typically provided by a sheet of expanded metal and has an outlet edge in liquid flow communication with the next lower tray via the downcomer.

8 Claims, 7 Drawing Sheets

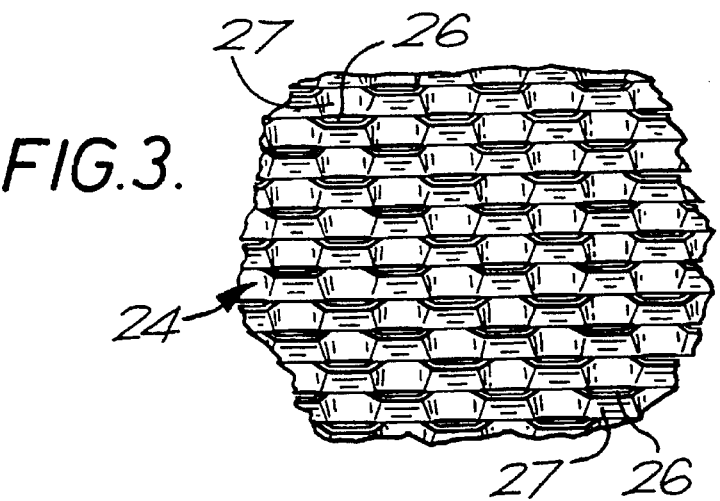
FIG.3.
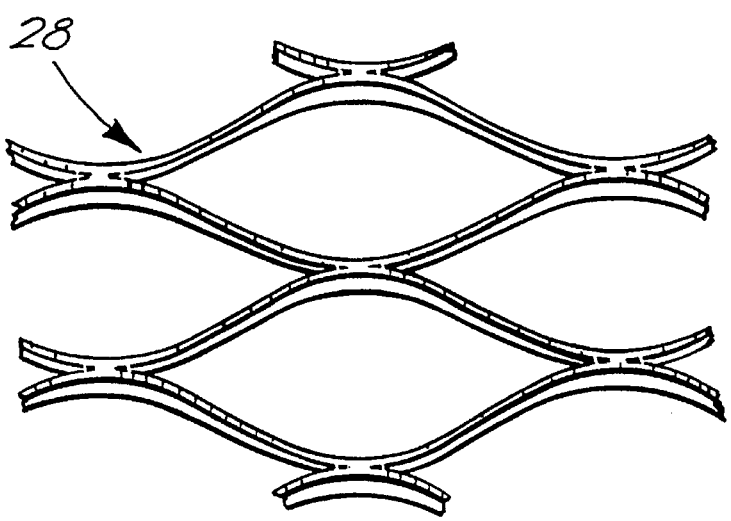
FIG.4.
FIG.5.
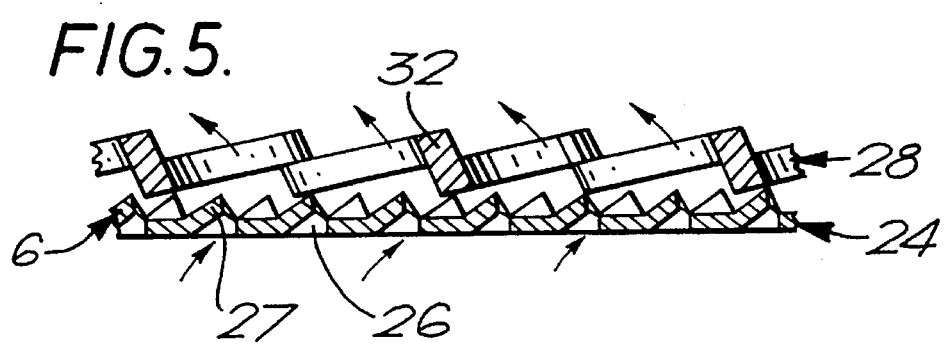

LIQUID VAPOR CONTACT APPARATUS

This is a continuation of application Ser. No. 08/274,054 filed Jul. 12, 1994, now abandoned.

BACKGROUND OF THE INVENTION

This invention relates to liquid-vapour contact apparatus. The term 'vapour' as used herein includes 'gas' within its scope and vice versa.

U.S. Pat. No. 5,091,119 relates to a liquid-gas contact device comprising: a liquid-gas contact tray having a liquid-bearing surface along which in use liquid is able to flow from a liquid receiving edge of the liquid bearing surface to an opposed liquid outlet edge thereof, a multiplicity of elongate apertures in the tray for the passage of gas from below to above the tray, each aperture having a gas deflector associated therewith and being so disposed as to impart to the gas a component of velocity in a direction toward the liquid outlet edge, and at least several liquid flow impedance members overlying the liquid-bearing surface between said liquid receiving edge and said outlet edge, the deflectors and flow impedance members having a height such that in operation of the device they are fully submerged in the liquid flowing thereacross. The tray preferably comprises a sheet of expanded metal. Preferably, the liquid flow impedance members are provided by a second sheet of expanded metal overlying the tray. The mesh size of the second sheet is greater than that of the first sheet. The first sheet of expanded metal typically has a percentage open area in the range of 20 to 30%. The liquid-gas contact device is particularly suitable for use as a distillation tray in for example the separation of air. In comparison with conventional distillation trays, it causes a relatively small pressure drop. Moreover, the liquid-gas contact device has good 'turndown' characteristics. That is to say it is capable of operating at high efficiency over a range of different gas flow rates (and hence gas velocities).

The maximum gas velocity at which such liquid-gas contact devices can be used efficiently is limited by a tendency for the vapour flowing vertically upwards from one tray to the next to carry liquid with it onto the next tray. Accordingly, if the liquid-vapour contact is performed as part of a distillation process, the ascending vapour becomes effectively enriched in a less volatile component of the mixture being distilled with the result that the separation is rendered less complete.

It is an aim of the present invention to provide an apparatus that ameliorates this problem.

SUMMARY OF THE INVENTION

According to the present invention there is provided apparatus comprising a liquid-vapour contact column housing an array of vertically spaced liquid-vapour contact trays and an arrangement of downcomers for conducting liquid from tray to tray down the array, characterised in that in a vapour space between at least one pair of adjacent trays is a liquid-vapour disengagement device having vapour passages therethrough and defining a surface or surfaces for the flow thereacross, in use, of any disengaged liquid to at least one outlet in liquid flow communication with the lower tray of said pair.

Preferably, the liquid-vapour disengagement device includes deflectors adapted to impart to ascending fluid a horizontal component of velocity, preferably in the direction of said at least one outlet. Preferably, the liquid-vapour disengagement device comprises a sheet of expanded metal, preferably horizontally disposed, comprising a multitude of apertures each having a raised tongue able in use to impart to ascending fluid said horizontal component of velocity.

Preferably, the trays each comprise part of a liquid-gas device as disclosed in U.S. Pat. No. 5,091,119. Other kinds of liquid-vapour contact tray may however be used, particularly those with a relatively large percentage open area, say in the range 20 to 30%. The liquid-vapour disengagement device typically has a percentage open area in the same order of magnitude as each tray. Thus, the liquid-vapour disengagement device preferably has a percentage open area in the range of 20 to 30%.

Said at least one outlet preferably comprises an edge of the liquid-vapour disengagement device. The edge preferably communicates with said lower tray of said pair via a downcomer which in operation conducts liquid from the upper tray to the lower tray. The said at least one outlet may however simply comprise a relatively large aperture in the liquid-vapour disengagement device (in comparison with the size of each vapour passage therethrough), said aperture being arranged directly above the inlet end of the lower tray such that in use disengaged liquid is able to fail under gravity onto the lower tray.

The vertical distance between the lower tray of said pair and the liquid-vapour disengagement device is preferably greater than the vertical distance between the device and the upper tray of said pair.

In some embodiments of the apparatus according to the invention, there is a liquid-vapour disengagement device between each pair of adjacent trays. In other embodiments, there is a liquid-vapour disengagement device between each pair of adjacent trays only in certain regions of the distillation column, typically being those regions where the vapour loading is heaviest (e.g. in the example of the lower pressure column of a double rectification column for the separation of air, that region where substantially all of the argon-oxygen separation takes place).

BRIEF DESCRIPTION OF THE DRAWINGS

Liquid-vapour contact apparatus according to the invention will now be described by way of example with reference to the accompanying drawings, in which:

FIG. 3 is a view from above the liquid outlet edge of a fragment of a sheet of expanded metal forming one liquid-vapour contact tray of the distillation column shown in FIGS. 1 and 2;

FIG. 4 is a similar view of a fragment of a sheet of expanded metal which is secured to the top of the sheet shown in FIG. 3;

FIG. 5 is a fragmentary sectional elevation view of a liquid-vapour contact device comprising the expanded metal sheets fragments of which are shown in FIGS. 3 and 4;

The drawings are not to scale.

DETAILED DESCRIPTION

Figure 1:
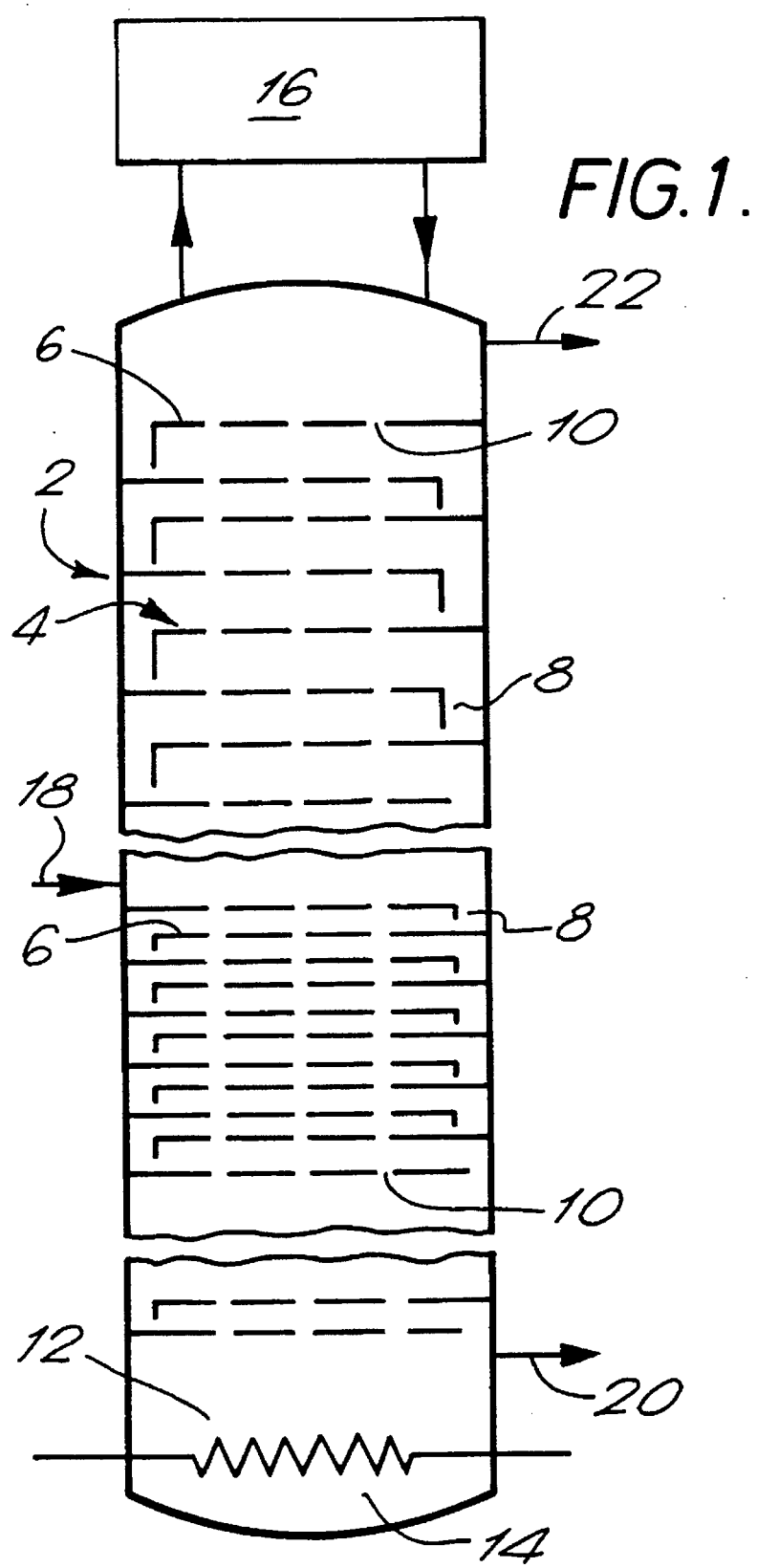
FIG. 1 is a schematic diagram of a distillation column.

Referring to FIG. 1 of the drawings, there is shown a distillation (or other form of liquid-vapour contact) column 2 having an array 4 of vertically spaced distillation (or liquid-vapour contact) trays 6 and an arrangement of downcomers 8 for conducting liquid from tray 6 to tray 6 down the array 4. Each tray 6 has vapour passages 10 formed therethrough. The bottom of the column 2 is formed with a sump 12 in which liquid collects. Immersed in the liquid is a boiler 14 through which a heating fluid is passed in operation of the column 2 in order to boil liquid in the sump 12. Accordingly, an upward flow of vapour through the column is created. Associated with the top of distillation column 2 is a condenser 16. In operation, vapour flows out of the top of the column 2 into the condenser 16, is condensed therein and at least part of the resulting condensate is returned to the top of the column 2 in order to cream a downward flow of liquid therethrough. The ascending vapour comes into intimate mass exchange relationship with the descending liquid on each distillation tray 6. Accordingly, if a two component mixture is being separated by fractional distillation in the column 2, the ascending vapour becomes progressively richer in the more volatile of the two components and the ascending liquid in the less volatile of the two components. The distillation column 2 has an inlet 18 for fluid to be separated, an outlet 20 near its bottom for a product enriched in the less volatile component, and an outlet 22 near its top for a product enriched in the more volatile component. In one example, the mixture to be separated is compressed air, essentially free of its less volatile constituents such as carbon dioxide and water vapour, at its saturation temperature; the product withdrawn through the outlet 20 is oxygen, and the product withdrawn through the outlet 22 is nitrogen.

Although not shown in FIG. 1, there is located between each pair of upper and lower trays 6 a liquid-vapour disengagement device. Such devices are illustrated in FIG. 2.

Figure 2:
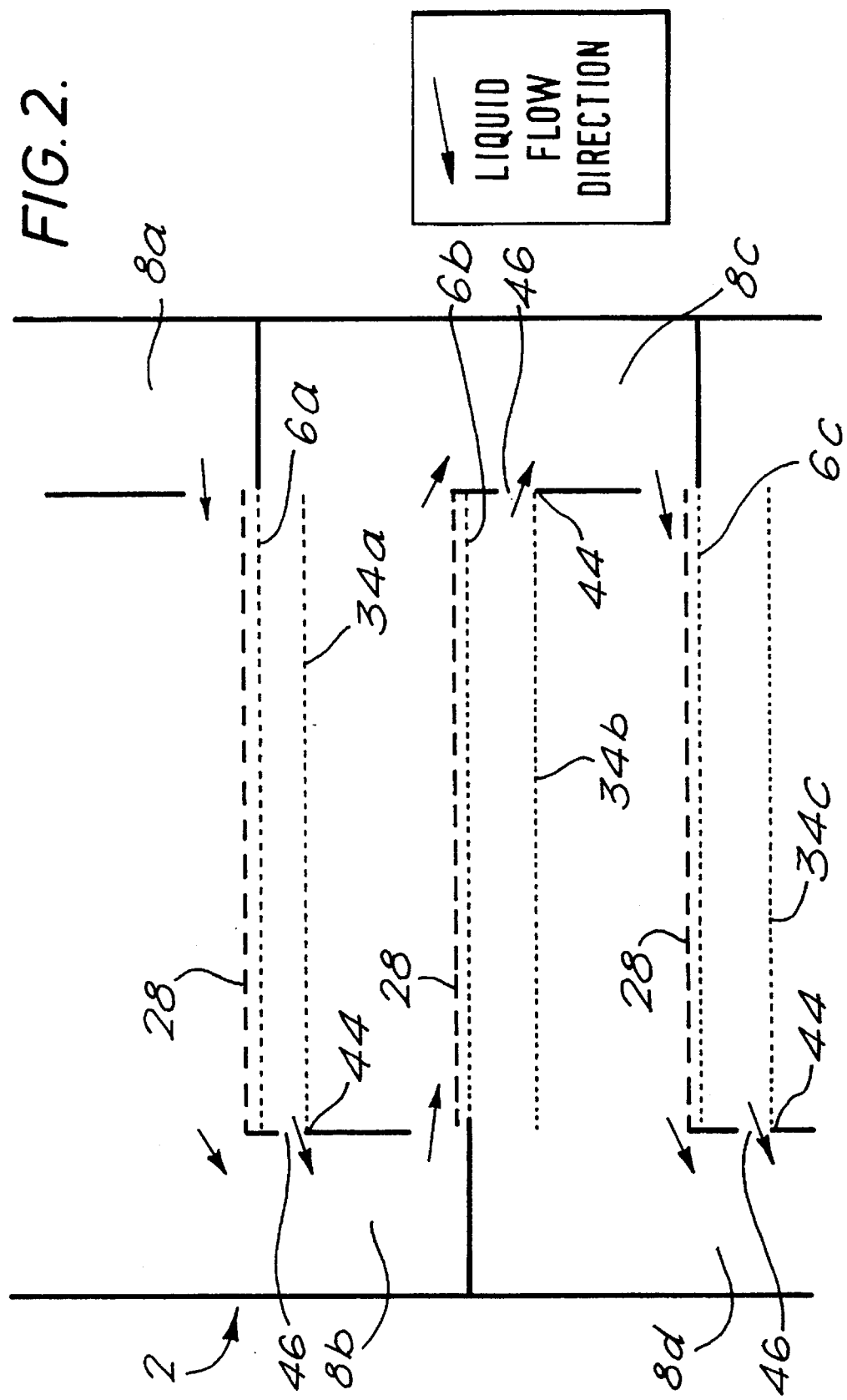
FIG. 2 is a schematic diagram on a larger scale than FIG. 1 showing a part of the distillation column illustrated in FIG. 1.

Referring to FIG. 2, a sequence in the column 2 of three trays 6a, 6b and 6c, is shown. A downcomer 8a conducts liquid onto the tray 6a from the tray immediately thereabove (not shown in FIG. 2); a downcomer 8b conducts liquid from tray 6a to 6b; a downcomer 8c conducts liquid from the tray 6b to 6c; and a downcomer 8d conducts liquid from the tray 6c to the tray immediately therebelow (now shown in FIG. 2). Each tray comprises a sheet 24 (see FIG. 3) of expanded metal having a multitude of slits 26 formed therein. The slits 26 constitute the vapour passages 10 schematically illustrated in FIGS. 1 and 2. Each slit has a raised tongue 27 associated therewith (as shown in FIG. 3).

Figure 6:
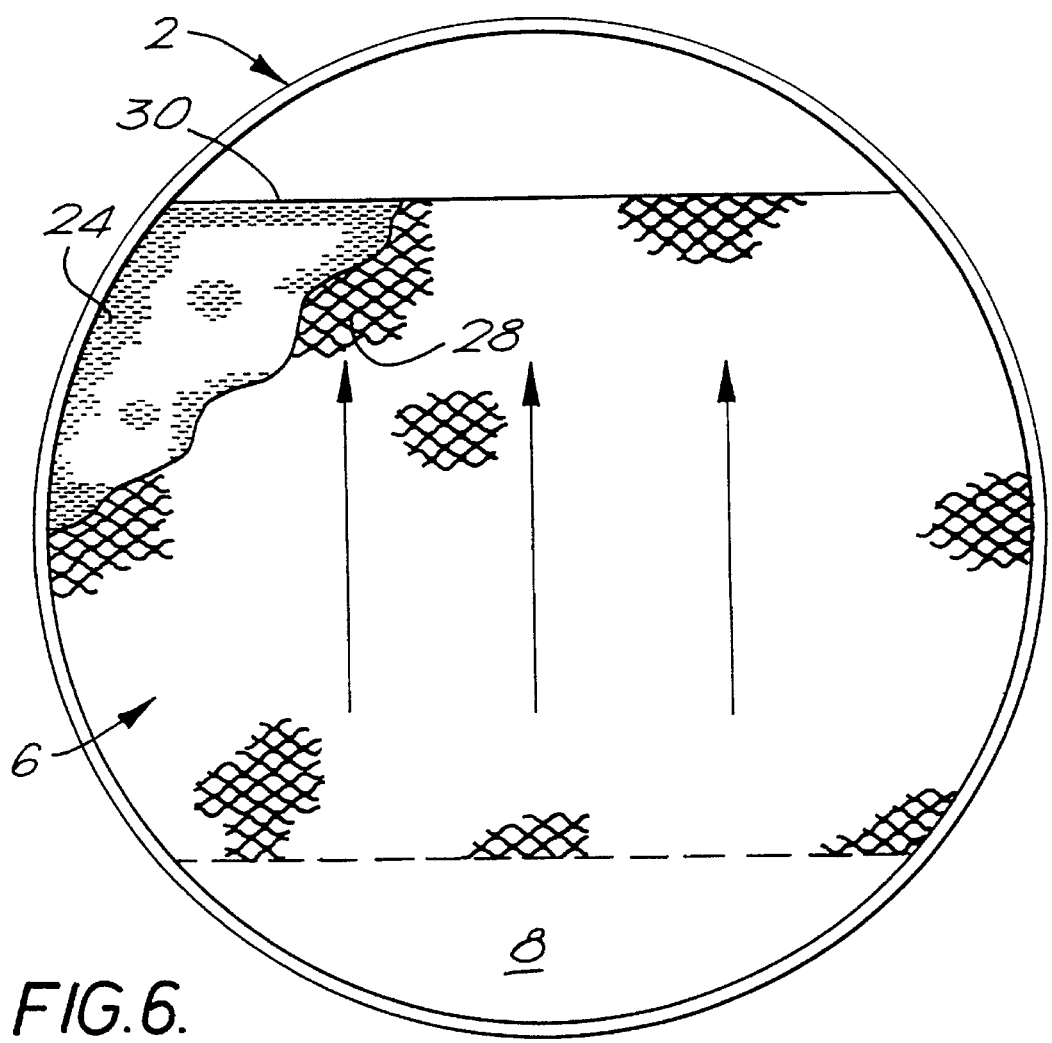
FIG. 6 is a fragmentary plan of the device shown in FIG. 5.

Referring again to FIG. 2, each tray 6 has extending across and in contact with its upper surface a second sheet 28 of expanded metal. This sheet is depicted in FIG. 4. The mesh size of the sheet 28 is considerably larger than that of the associated lower sheet 24. The arrangement of a distillation tray 6 comprising a lower sheet 24 of expanded metal having an upper sheet 28 associated therewith is further illustrated in FIGS. 5 and 6. Referring to FIG. 5, in use, the upper sheet 28 is wholly submerged in liquid flowing thereacross. The tongues 27 of the lower sheet 24 impart to ascending vapour a horizontal component of velocity in the direction of the outlet edge 30 (see FIG. 6) of the tray. The upper sheet 28 of expanded metal has strands 32 which restrain the flow of liquid towards the outlet edge of the tray. Thus, the upper sheet 28 is able to moderate the flow of liquid across the tray. Vigorous liquid-vapour contact takes place on each tray 6. Further information on the configuration and operation of a liquid-vapour contact device comprising a lower and an upper sheet of expanded metal is contained in U.S. Pat. No. 5,091,119.

Figure 7:
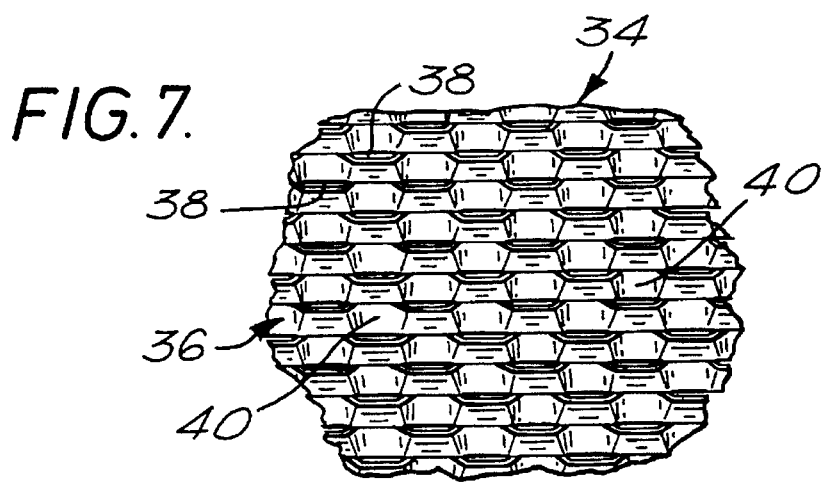
FIG. 7 is a view from above its liquid outlet edge of a liquid-vapour disengagement device forming part of the distillation column shown in FIGS. 1 and 2.

Referring again to FIG. 2, there are shown liquid-vapour disengagement devices 34a, 34b and 34c. Device 34a is located between the trays 6a and 6b, device 34b between trays 6b and 6c, and device 34c between the tray 6c and the tray (not shown in FIG. 2) immediately therebelow. Each liquid-vapour disengagement device 34 comprises a sheet 36 of expanded metal. A fragment of one such sheet 36 is shown in FIG. 7 and has a multitude of slits 38 formed therethrough. Associated with each slit 38 is a raised tongue 40. The sheets 36 preferably have the same mesh size as the sheets 24 of expanded metal. Typically, this size is such that the respective sheets have an open area of 20 to 30%. In operation, vapour flowing upwards through the slits 38 in the device 34 is deflected generally horizontally. Owing to the difference in density between the vapour and any liquid entrained therein, this deflection tends to disengage liquid from the vapour. The liquid is caused to flow along the upper face 42 of the liquid-vapour disengagement device 34. The vapour ascends to the tray 6 thereabove. The tongues 40 are orientated so as to deflect the disengaged liquid in the direction of a liquid outlet edge 44 of each device 34 (see FIG. 2). Each liquid outlet edge 44 feeds liquid to an associated downcomer through a slot 46 in the wall of the respective downcomer 8. Disengaged liquid is thus returned to the inlet end of the tray 6 immediately therebelow via the downcomer 8 serving that tray 6. Each device 34 is generally circular in shape having a chordal liquid outlet edge 44 and is of generally the same dimensions as the tray 6 immediately thereabove.

Each liquid-vapour disengagement device 34 located between a respective pair of trays 6 is preferably situated closer to the upper tray than to the lower tray.

Each liquid-vapour disengagement device 34 performs a distinctly different function from that of the trays 6. Mass exchange between the liquid and vapour phases takes place on the trays. A relatively small amount of mass exchange takes place on the devices 34. Each tray 6 receives liquid from a tray above and vapour from a tray below. The liquid and vapour compositions are therefore substantially different from equilibrium concentrations and there is, in effect, a compositional driving force favouring mass transfer between the liquid and vapour phases. Each device 34, however, tends to receive both liquid and vapour from the tray below. There is therefore a much smaller compositional driving force favouring mass exchange between the liquid and vapour phases on the devices 34. Moreover, since, in normal operation, the only liquid received by each device 34 is that entrained in vapour ascending from the tray 6 therebelow, there is a relatively small depth of liquid on the device and hence a shorter average period of contact between each individual molecule of gas and liquid. In addition, the liquid flow velocity on each device 34 tends to be greater than on each tray 6 since the devices 34 have no upper sheet of expanded metal on them retarding liquid flow. There is thus little opportunity for any major degree of mass exchange to take place on the devices 34.

In one example of operation of a distillation column in the separation of air, there is a spacing of 15 cm between each pair of successive trays. The trays are of a kind as shown in FIGS. 3 to 6 of the accompanying drawings. The column is capable of being operated efficiently at maximum F values of up to 1.7 meters per second. Above this maximum value, such is the turbulence of the liquid-vapour mixture on each tray 6, that there tends to be carry-over of liquid with the vapour from one tray to the next one above. To operate the column efficiently at an F value of 5 m/s would require approximately a 61 cm spacing between successive trays. It is found however that by using an apparatus according to the invention the tray spacing can be merely 20.3 cm when operating with an F value of 5 m/s. In such an arrangement, the vertical distance between the upper tray and the liquid-vapour disengagement device is 5 cm, and the vertical spacing between the liquid-vapour disengagement device and the lower tray is 15 cm. It can thus be appreciated that for a given number of trays in a liquid-vapour contact column, the apparatus according to the invention affords a substantially wider range of operability for a given tray spacing but at the cost of an increased pressure drop.

Another advantage of the apparatus according to the invention is that as well as, in effect, enabling the maximum tolerable vapour velocity to be increased, it may also enable the minimum tolerable vapour velocity to be decreased. A well known phenomenon in the operation of distillation trays is that if the vapour velocity is too low, the trays tend to weep, that is to say liquid falls through the vapour passages from one tray to the next below. The apparatus according to the invention enables such liquid to be intercepted by the liquid-vapour disengagement devices and fed in an orderly manner to the tray below. Accordingly, a small degree of weeping may be tolerable. Whether or not the apparatus according to the invention is required to accommodate some degree of weeping is a factor that may influence the design of the liquid-vapour disengagement device. If, with reference to FIG. 7, there is a need to cater for weeping, the size of the slits 38 may need to be smaller than that of the slits 26 in the sheet 24 shown in FIG. 3. If, on the other hand, there is no need to cater for weeping, the size of the slits 38 in the sheet 36 can be larger than that of the slits 26 in the sheet 24, although it may be more convenient to fabricate the sheets 24 and 36 from identical expanded metal.

A quantitative hydraulic investigation of the apparatus according to the invention was performed on a hydraulic test rig comprising a three-tray test unit having a width of 7 cm to enable air F-factors of up to about 6 to be observed, an air blower and air distributor at the bottom of the unit to enable a flow of air upwardly through the test unit to be created, and a water pump to enable a flow of water downwardly through the test unit to be created. The tray spacing was about 20 cm. The length of the liquid flow path along each tray was 120 cm, sufficient to observe any hydraulic gradient effects. The downcomers were large enough to allow high liquid loadings to be studied, the water pump being capable of providing loadings well above 300 cm$^3$/cm s. The downcomer underflow clearances were adjustable up to 5 cm clearance, and each slot through which a liquid-disengagement device passed captured liquid into an associated downcomer was adjustable up to 3 cm.

Disengagement devices were employed in association with the two lower trays of the rig but not the top tray. A demister pad was disposed in the gas space above the top tray.

Each of the three trays of the test rig comprised two sheets of superimposed expanded metal and was therefore in accordance with U.S. Pat. No. 5,091,119. In each tray, the lower sheet was of EXPAMET 408 expanded metal, and the upper (flow control) sheet was of EXPAMET 2089 expanded metal. The lower sheet of EXPAMET 408 expanded metal had elongate slots, about 15 mm long and about 2 mm wide, which provide a high maximum open area of about 40% of the bubbling area on the tray surface. The material chosen for the liquid-vapour disengagement devices associated with the two lower trays was also EXPAMET 408 expanded metal, although EXPAMET 607 expanded metal which has an open area of about 22.5% maximum could, for example, alternatively have been used.

In a modification to the arrangement shown in FIG. 2, the liquid-vapour disengagement sheets both extended from the column wall at their upstream end so as to simplify assembly. (If desired, however, each disengagement sheet may be supported by stays extending downwards from the tray above.)

In the results set out below, each downcomer underflow clearance was set at 2.5 cm and the width of the slot through which each liquid-vapour disengagement device passed captured liquid to an associated downcomer was 1 cm.

Figure 8:
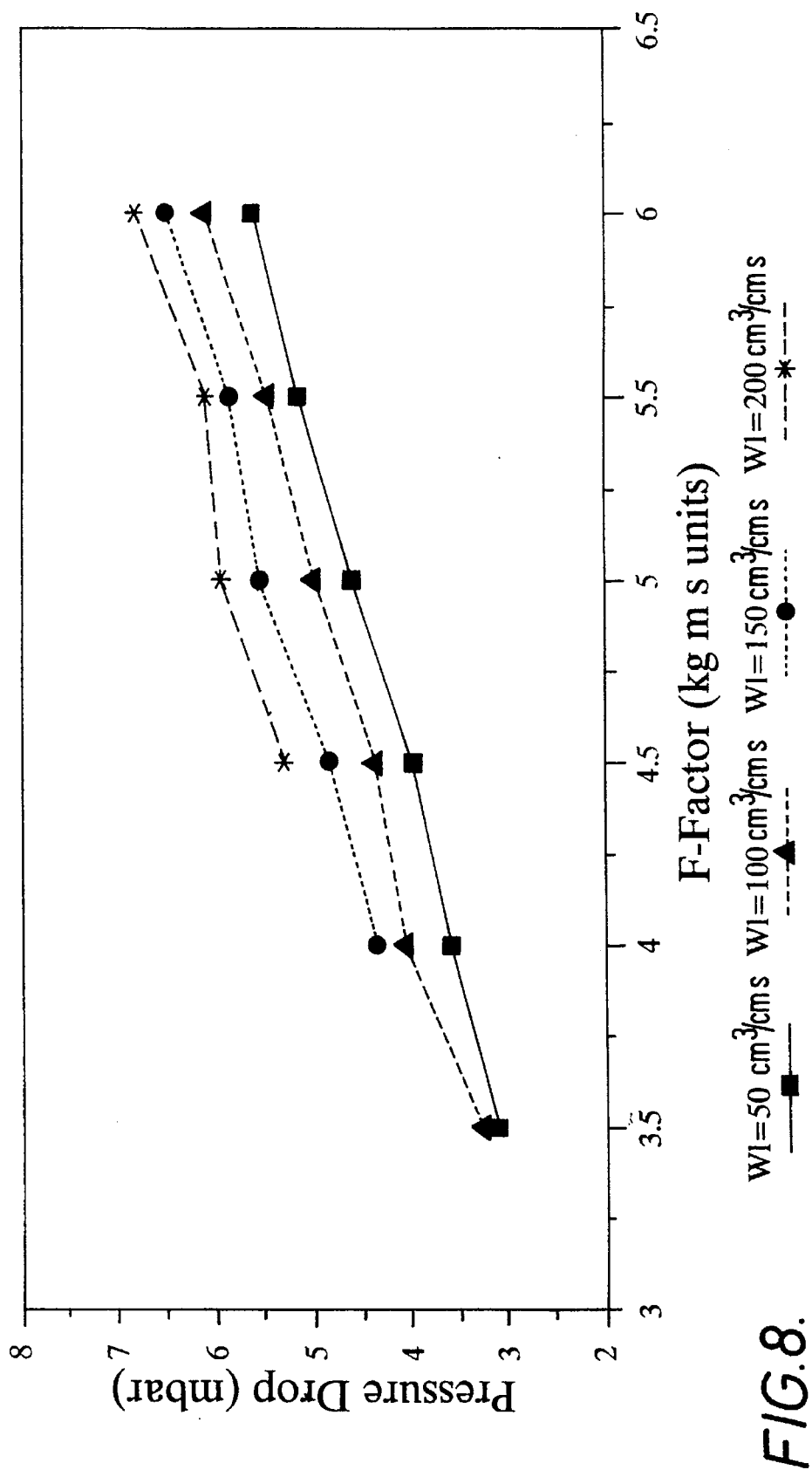
FIG. 8 is a graph showing the effect of F-factor on the pressure drop of a liquid-vapour contact tray having a liquid-vapour disengagement device associated therewith.
Figure 9:
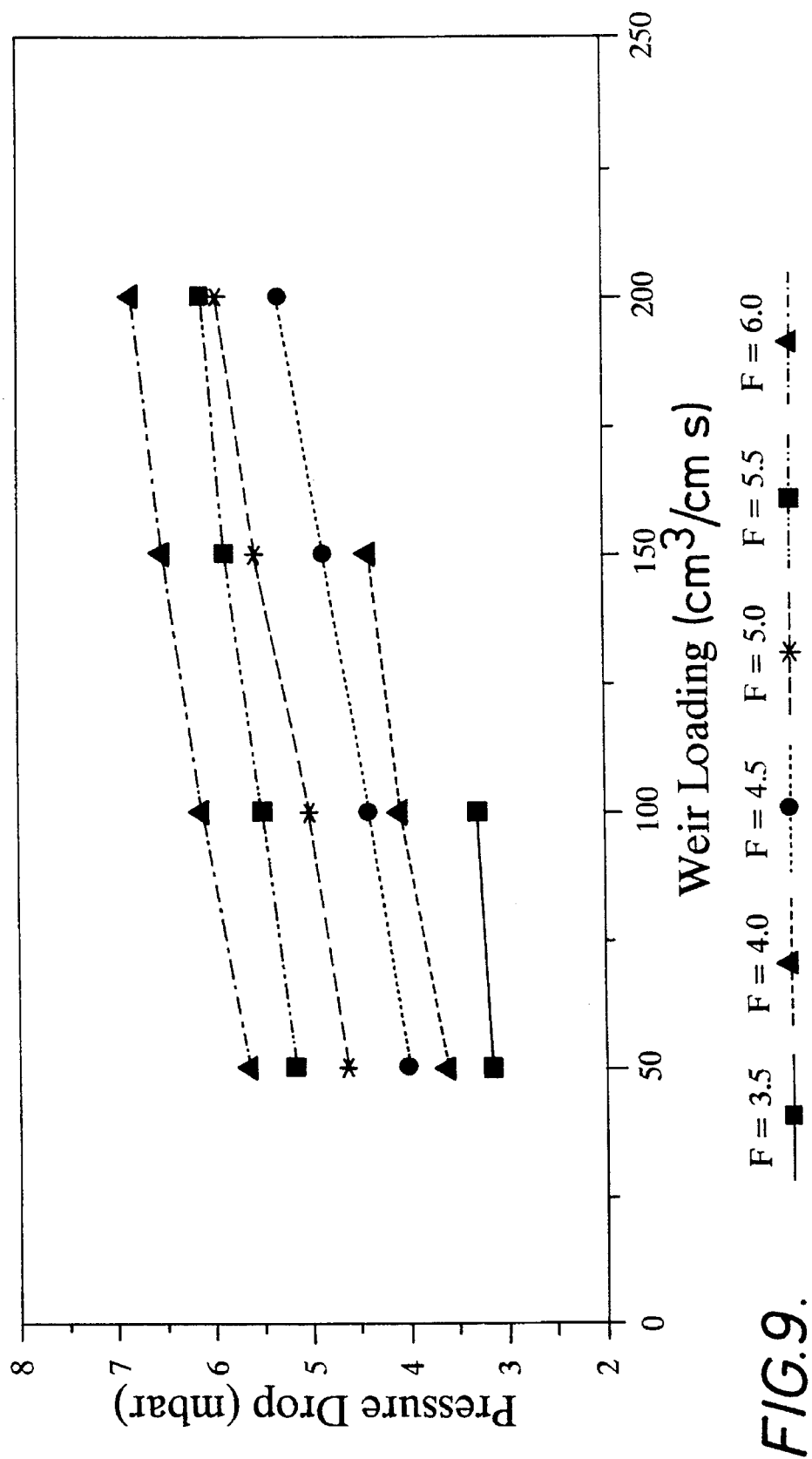
FIG. 9 is a graph showing the effect of weir loading on the pressure drop of a liquid-vapour contact tray having a liquid-vapour disengagement device associated therewith.

In the Table below there are set out results showing the variation of F-factor with weir loading and pressure drop for the middle tray of the three. (The pressure drop readings are for the combination of the tray and its associated disengagement device.) Comments are made on the nature of the liquid flow at the different weir loadings and F-factor. With a weir loading of 100 cm$^3$ cm$^{-1}$ s$^{-1}$, good liquid flow conditions were observed when the F-factor was as high as 6: a remarkable result since hydraulic difficulties normally at much lower F-factors with conventional sieve trays. The results shown in the Table are represented graphically in FIGS. 8 and 9 of the accompanying drawings.

Figure 10:
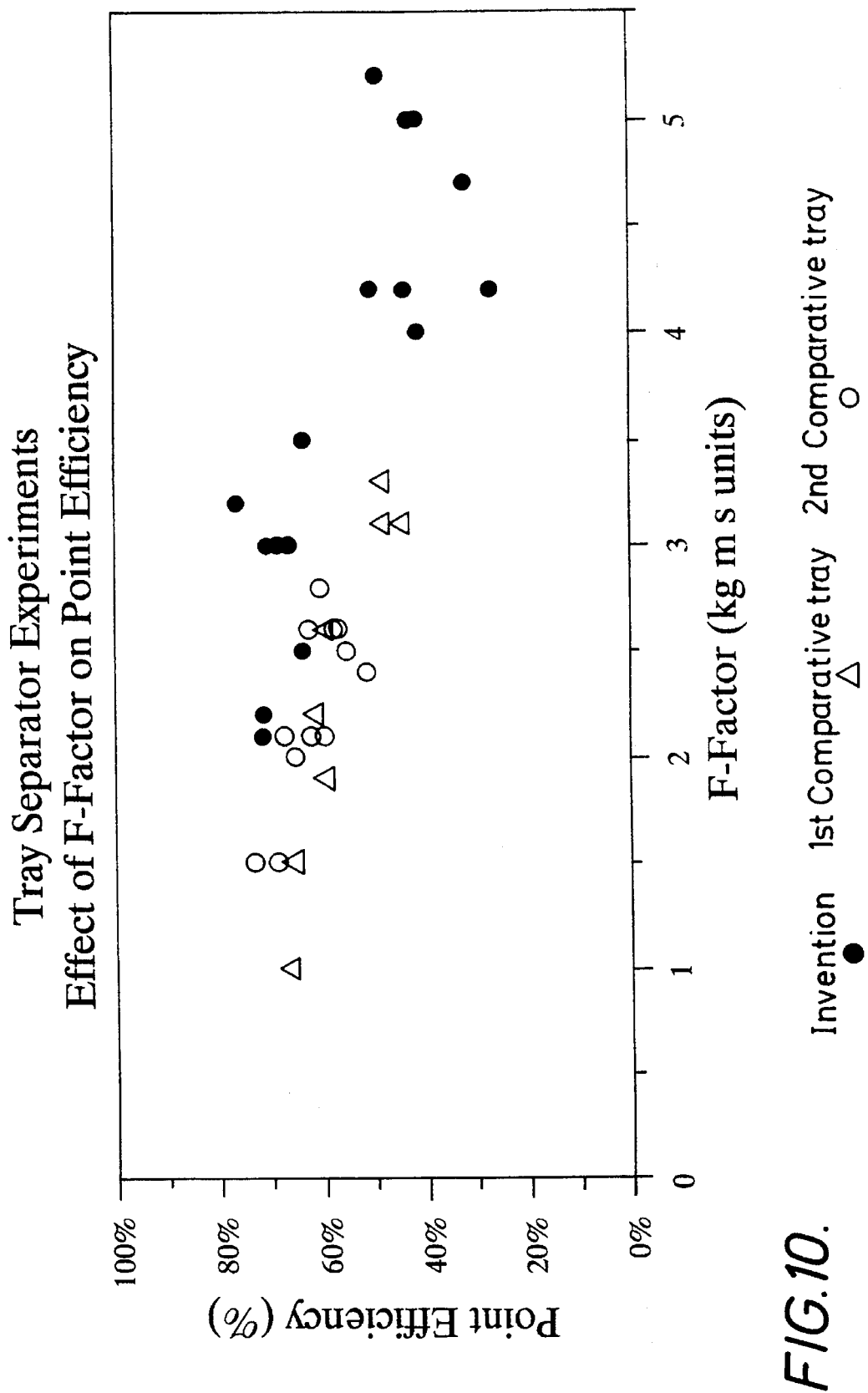
FIG. 10 is a graph showing the effect of F-factor on point efficiency of a liquid-vapour contact tray having a liquid-vapour disengagement device associated therewith.

In FIG. 10, point efficiency results for the tray-disengagement device combination tested in the hydraulic test rig are shown. The solid circles represent results for the tray-disengagement device combination. The open circles and open triangles represent results previously obtained for two distillation trays in accordance with U.S. Pat. No. 5,091,119, one tray comprising a lower sheet of EXPAMET 408 expanded metal and an upper sheet of EXPAMET 1294 expanded metal (the results for this tray being represented by the open triangles), and the other tray comprising a lower sheet of EXPAMET 607 expanded metal and an upper sheet of EXPAMET 2089 (the results for this tray being represented by the open circles). Acceptable point efficiencies for the tray-disengagement device combination according to the invention are achieved at F-factors of about 4 and about 5; such results cannot be achieved with the two known distillation trays unless they are provided with liquid-vapour disengagement devices according to the invention. Furthermore, at F-factors of 2 and 3 the combination of the tray and liquid-vapour disengagement device in accordance with the invention generally has a higher point efficiency than either of the conventional trays.

The experimental results obtained point to the possibility of substantially reducing the diameter of distillation columns without adversely affecting their performance.

TABLE

| F-factor (kg m s) Unit | Weir loading (cm³/cm⁵) | Pressure drop (mbar) | Comments |
|---|---|---|---|
| 3.5 | 50 | 3.14 | Nice biphase on main tray. Downcomers sealed. No weeping. |
| 3.5 | 100 | 3.29 | Weeping from bottom separator, lower limit reached. |
| 3.5 | 150 | — | |
| 3.5 | 200 | — | |
| 4.0 | 50 | 3.61 | Good even biphase. Liquid in downcomer well below slot. Separators clearing well. |
| 4.0 | 100 | 4.08 | Nice deep biphase. Liquid nearing slot. |
| 4.0 | 150 | 4.39 | Weeping from lower separator. Pulsing of gas through main tray. Lower limit of operation. |
| 4.0 | 200 | — | |
| 4.5 | 50 | 4.00 | Even biphase. Liquid at slot. |
| 4.5 | 100 | 4.39 | Deep biphase. Liquid just at slot, separators clearing well. |
| 4.5 | 150 | 4.86 | Liquid above slot. Separator clearing well. Clear liquid under underflow. |
| 4.5 | 200 | 5.33 | Liquid near to filling downcomers. Slight difficulty in clearing from separator. |
| 5.0 | 50 | 4.63 | Thin biphase on tray, separator clearing well. |
| 5.0 | 100 | 5.02 | Liquid above slot in downcomer, separator clearing well. Deep froth on main tray. |
| 5.0 | 150 | 5.57 | Liquid above main tray. Separators still clearing. |
| 5.0 | 200 | 5.96 | Downcomers full. Separator just holding liquid. |
| 5.5 | 50 | 5.17 | Liquid near to slot. Thin biphase on tray. |
| 5.5 | 100 | 5.49 | Liquid above slot. Separator clearing well. Froth to separator level. |
| 5.5 | 150 | 5.88 | Liquid above tray level. Separator having difficulty in holding liquid. |
| 5.5 | 200 | 6.12 | Downcomers completely full. Separators dumping at outlet. |
| 6.0 | 50 | 5.64 | Thin biphase. Liquid at slot. Separators clearing well. |
| 6.0 | 100 | 6.12 | Good biphase. Liquid up to tray level. Separator clearing well. |
| 6.0 | 150 | 6.51 | Downcomers nearly full. Liquid clearing separator. |
| 6.0 | 200 | 6.82 | Whole apparatus full of water. |

NOTE:
The F factor is expressed in units of $[(m/s) \cdot (kg/m^3)^{1/2}]$

I claim:

1. An apparatus comprising: a liquid-vapour contact column; an array of vertically spaced liquid-vapour contact trays and an arrangement of downcomers for conducting liquid from tray to tray down the array housed within said liquid-vapour contact column; and a liquid-vapour disengagement device situated within a vapour space located between one pair of adjacent trays, said liquid-vapour disengagement device having vapour passages therethrough, at least one surface for liquid flow thereacross, said at least one surface having at least one outlet in liquid flow communication with the lower tray of said pair, and deflectors adapted to impart to ascending liquid a horizontal component of velocity in the direction of said at least one outlet, the at least one outlet of the liquid-vapor disengagement device comprising a liquid outlet edge thereof communicating with the lower tray of the pair via a downcomer which in operation conducts liquid from the upper tray to said lower tray.

2. The apparatus as claimed in claim 1, wherein the vertical distance between the said lower tray and the liquid-vapour disengagement device is greater than the vertical distance between the liquid-vapour disengagement device and the said upper tray.

3. The apparatus as claimed in claim 1, wherein said liquid-vapour disengagement device comprises a sheet of expanded metal comprising a multitude of apertures each having a raised tongue able in use to impart to ascending fluid said horizontal component of velocity.

4. The apparatus as claimed in claim 3, wherein said sheet of expanded metal is generally horizontally disposed.

5. The apparatus as claimed in claim 1, wherein each tray has a liquid-beating surface along which, in use, liquid is able to flow from a liquid receiving edge of the liquid bearing surface to an opposed liquid outlet edge thereof, and a multiplicity of elongate apertures in the tray for the passage of vapour from below to above the tray, each aperture having associated therewith a gas deflector so disposed as to impart to the gas a component of velocity in a direction towards the liquid outlet edge, the tray co-operating with at least several flow impedance members overlying the liquid-bearing surface, and the deflectors and flow impedance members having a height such that in operation of the tray they are wholly submerged in the liquid flowing thereacross.

6. The apparatus as claimed in claim 5, wherein each tray and its gas deflectors are provided by a lower sheet of expanded metal, and the flow impedance members by an upper sheet of expanded metal, the upper sheet being of larger mesh size than the lower sheet.

7. The apparatus as claimed in claim 5, wherein each tray has a percentage open area in the range of 20 to 30%.

8. The apparatus as claimed in claim 7, wherein the liquid-vapour disengagement device has a percentage open area in the range of 20 to 30%.

* * * * *